(12) United States Patent
Benko

(10) Patent No.: US 7,645,108 B2
(45) Date of Patent: Jan. 12, 2010

(54) STACK LOADING AND UNLOADING CART

(76) Inventor: John C. Benko, 30878 Riviera La., Westlake, OH (US) 44145

( * ) Notice: Subject to any disclaimer, the term of this patent is extended or adjusted under 35 U.S.C. 154(b) by 1043 days.

(21) Appl. No.: 10/788,080

(22) Filed: Feb. 26, 2004

(65) Prior Publication Data

US 2005/0191159 A1 Sep. 1, 2005

(51) Int. Cl.
*B62B 1/12* (2006.01)
(52) U.S. Cl. .................. 414/490; 414/793.8; 414/796.7; 280/47.29
(58) Field of Classification Search .................. 414/490, 414/491, 793.8, 796.7, 925; 280/47.29, 47.28, 280/47.27, 654; 254/323, 385
See application file for complete search history.

(56) References Cited

U.S. PATENT DOCUMENTS

| | | | | |
|---|---|---|---|---|
| 2,928,639 A * | 3/1960 | Shelley | ...................... | 312/306 |
| 4,619,467 A * | 10/1986 | Lafferty | ...................... | 267/24 |
| 4,741,518 A * | 5/1988 | Wallis | ......................... | 267/75 |
| 4,764,075 A * | 8/1988 | Cox et al. | ................... | 108/136 |
| 4,798,398 A * | 1/1989 | Cummins | ............ | 280/124.159 |
| 5,197,718 A * | 3/1993 | Wallis | ......................... | 267/119 |
| 5,251,922 A * | 10/1993 | Mann | ...................... | 280/47.29 |
| 5,386,975 A * | 2/1995 | Wallis | ......................... | 267/119 |
| 5,462,140 A * | 10/1995 | Cazort et al. | ................ | 188/275 |
| 5,575,605 A * | 11/1996 | Fisher | ........................ | 414/490 |
| 5,647,720 A * | 7/1997 | Golicz et al. | ................ | 414/490 |
| 5,885,047 A * | 3/1999 | Davis et al. | .................. | 414/490 |
| 5,911,408 A * | 6/1999 | Berends et al. | ............. | 254/2 B |
| 5,975,826 A * | 11/1999 | Scholder | ..................... | 414/444 |
| 5,984,050 A * | 11/1999 | Ronald | ........................ | 187/226 |
| 6,220,406 B1 * | 4/2001 | de Molina et al. | ........... | 188/275 |
| 6,364,330 B1 * | 4/2002 | Weber et al. | ............. | 280/47.35 |
| 6,457,727 B1 * | 10/2002 | Tolly | ....................... | 280/47.28 |
| 6,530,740 B2 * | 3/2003 | Kim | ........................... | 414/490 |
| 6,537,017 B2 * | 3/2003 | Stone | ......................... | 414/672 |
| 2001/0038786 A1 * | 11/2001 | Kim | ........................... | 414/490 |
| 2004/0000260 A1 * | 1/2004 | Connor | .................. | 108/147.15 |
| 2005/0110232 A1 * | 5/2005 | DiBenedetto | ............ | 280/47.29 |

FOREIGN PATENT DOCUMENTS

GB 2269806 A * 2/1994

* cited by examiner

*Primary Examiner*—James Keenan
(74) *Attorney, Agent, or Firm*—Renner Otto Boisselle & Sklar

(57) ABSTRACT

A cart includes a projecting load receiving platform mounted on a slide frame in turn mounted for vertical movement on a main frame. A spring mechanism urges the slide frame and platform to an elevated position so that objects may be stacked on the platform without placing them on the floor. As the weight of the stack on the platform increases the platform starts to descend until the cart is full. Conversely as items are removed from the top of the stack the platform elevates so the operator doesn't have to pick up an object from the floor. The spring mechanism uses a plurality of air springs each with a different load rating and operating in a cascading fashion. A pivoting weight operated latch holds the platform in its bottom position until released by a kick plate.

14 Claims, 11 Drawing Sheets

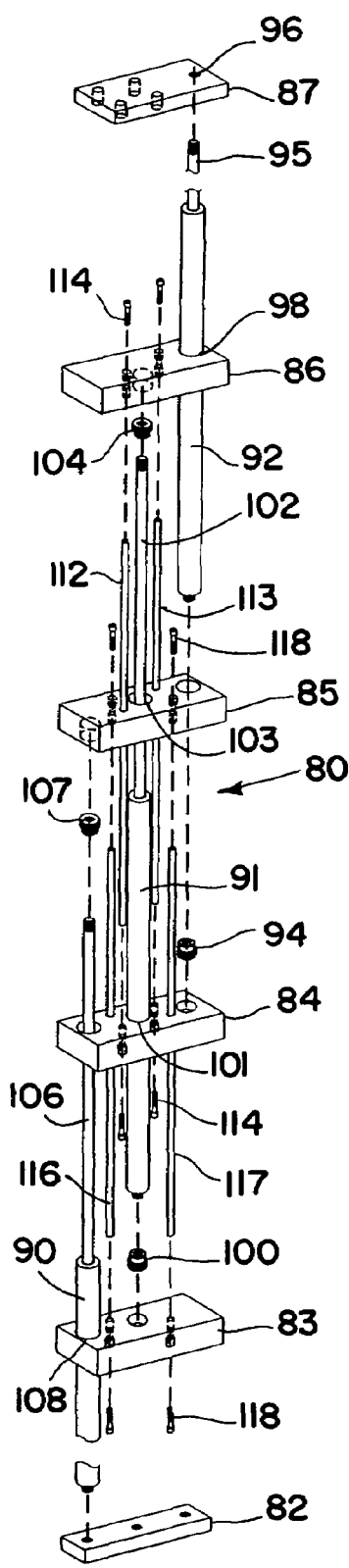
FIG. 6
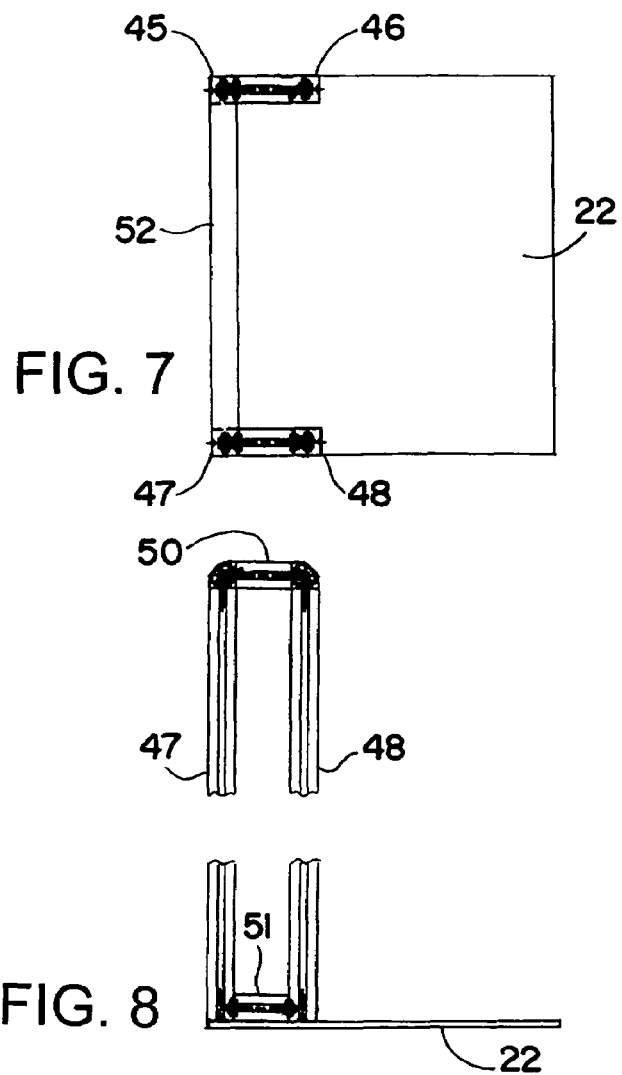
FIG. 7
FIG. 8
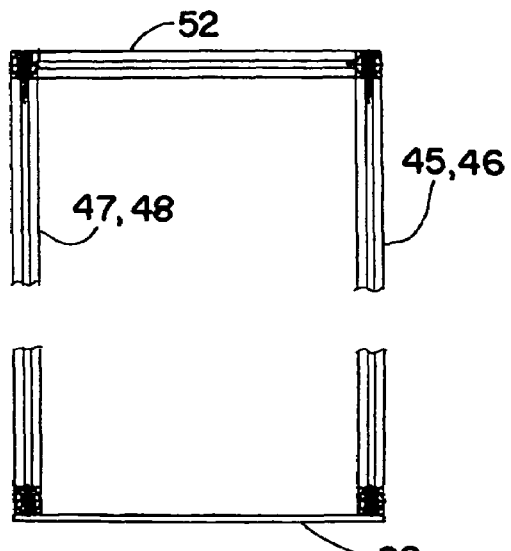
FIG. 9

STACK LOADING AND UNLOADING CART

DISCLOSURE

This invention relates generally as indicated to a transfer cart, and more particularly a wheeled cart for transferring a stack of relatively heavy items without requiring the user to place or pickup any of the items on or from the floor or surface on which the cart is moved.

BACKGROUND OF THE INVENTION

Many back injuries are sustained when someone has to pick up or place a relatively heavy object either from, or on the floor. This is particularly so if the lifting or placing has to be done repeatedly.

Many such objects or items are transferred from a truck, for example, to a customer, or sometimes to or from a warehouse. A two wheeled dolly or cart known as a hand truck is often used for such purposes. For example, a beverage distributor will remove cases or kegs from a truck and stack them one at a time on the projecting shelf at the bottom of the cart and build a stack. When the cart is full the stack is tilted back and wheeled into a customer's business, for example, usually to be stacked again in a storage area. The case at the top of the stack is the easiest to place or transfer because it can be moved or placed without bending over.

It would accordingly be desirable if a cart or dolly could be provided where the stack on the cart or dolly is formed on or removed from the cart without bending over.

SUMMARY OF THE INVENTION

The invention relates to a cart having a platform on which a stack of items may be built. As the weight of the stack increases the platform incrementally descends. In this manner the stack may be built by placing each item at an elevated position. The stack thus drops from under the user as the stack is built. Conversely, as an item is lifted from the top of the stack the platform elevates avoiding the necessity to pick or place any item with respect to the floor.

The cart includes an air or gas spring mechanism achieving four positions of the platform with three springs and an interconnecting slide block mechanism. The gas springs may each be rated differently increasing in load rating top to bottom, so that they operate in a cascading fashion.

In a hand cart form, a bottom fixed stabilizing platform is provided extending forwardly of two wheels so that the cart will be stabilized and stand upright on a floor or flat surface. In one embodiment the platform is latched in its lowermost position and will remain there until the latch is released. In this manner the platform may be unloaded while down and then returned to its elevated position when wholly or partially unloaded.

The present invention has wide utility in the transfer of stackable items. A few of the examples are cardboard boxes used by movers, or for the storage or shipment of files, beverage cases or kegs, or bottles of water, luggage, sacks of cement, feed, or anything else stackable as discrete loads.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 6 is an exploded perspective view of the load spring balancing and slide block mechanism;

FIG. 7 is a top plan view of the main frame;

FIG. 8 is a broken side elevation of the main frame;

FIG. 9 is a broken front elevation of the main frame;

DETAILED DESCRIPTION OF THE PREFERRED EMBODIMENT

Referring initially to FIGS. 1-5, there is illustrated a stack loading and unloading cart shown generally at 20 which includes a main upright frame 21 having a forwardly projecting base stabilizing plate 22 secured to the bottom thereof as indicated at 23. Also secured to the bottom of the main upright frame is a vertically extending heel plate 25 shown more clearly in FIG. 5.

Figure 1:
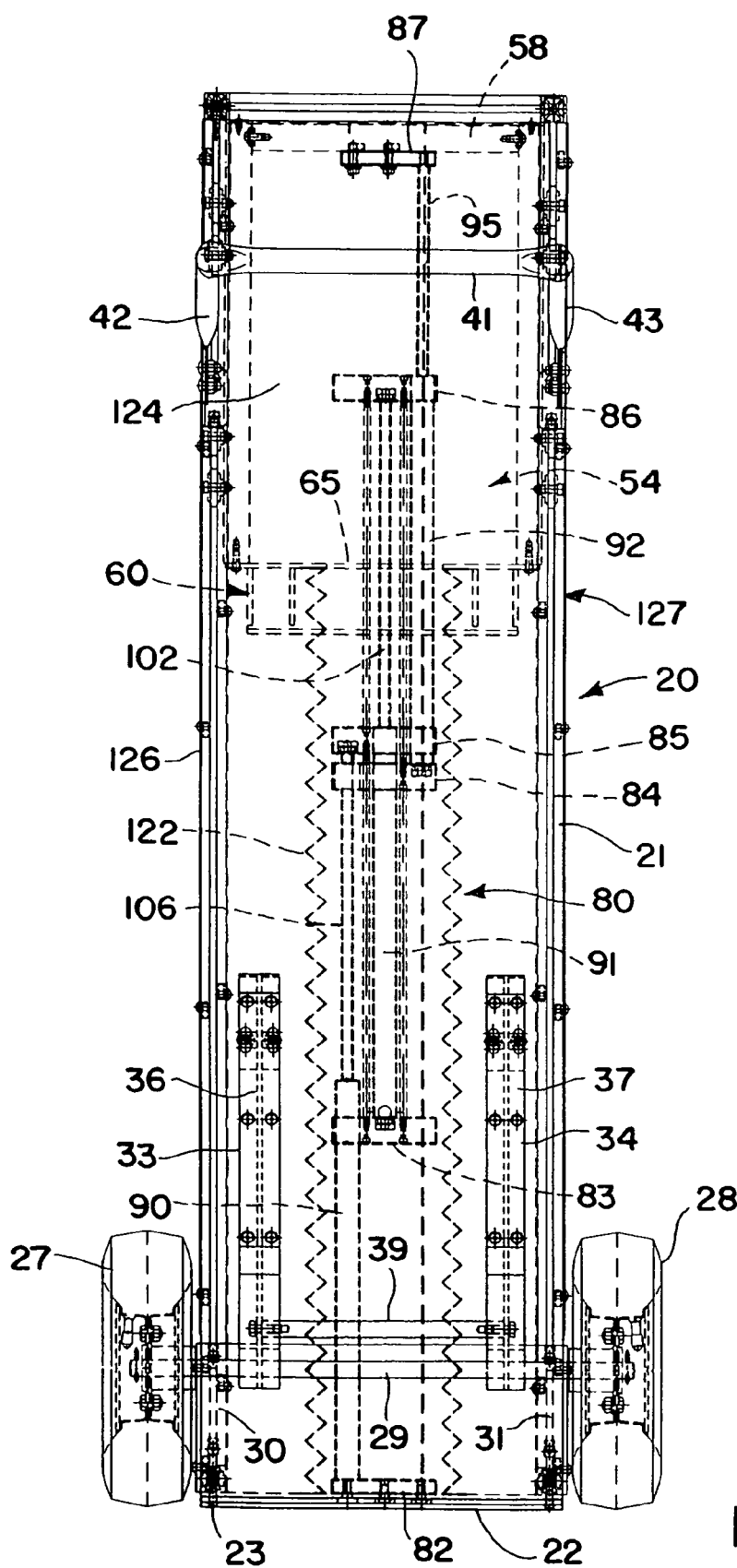
FIG. 1 is a rear elevation of a cart in accordance with the present invention.
Figure 2:
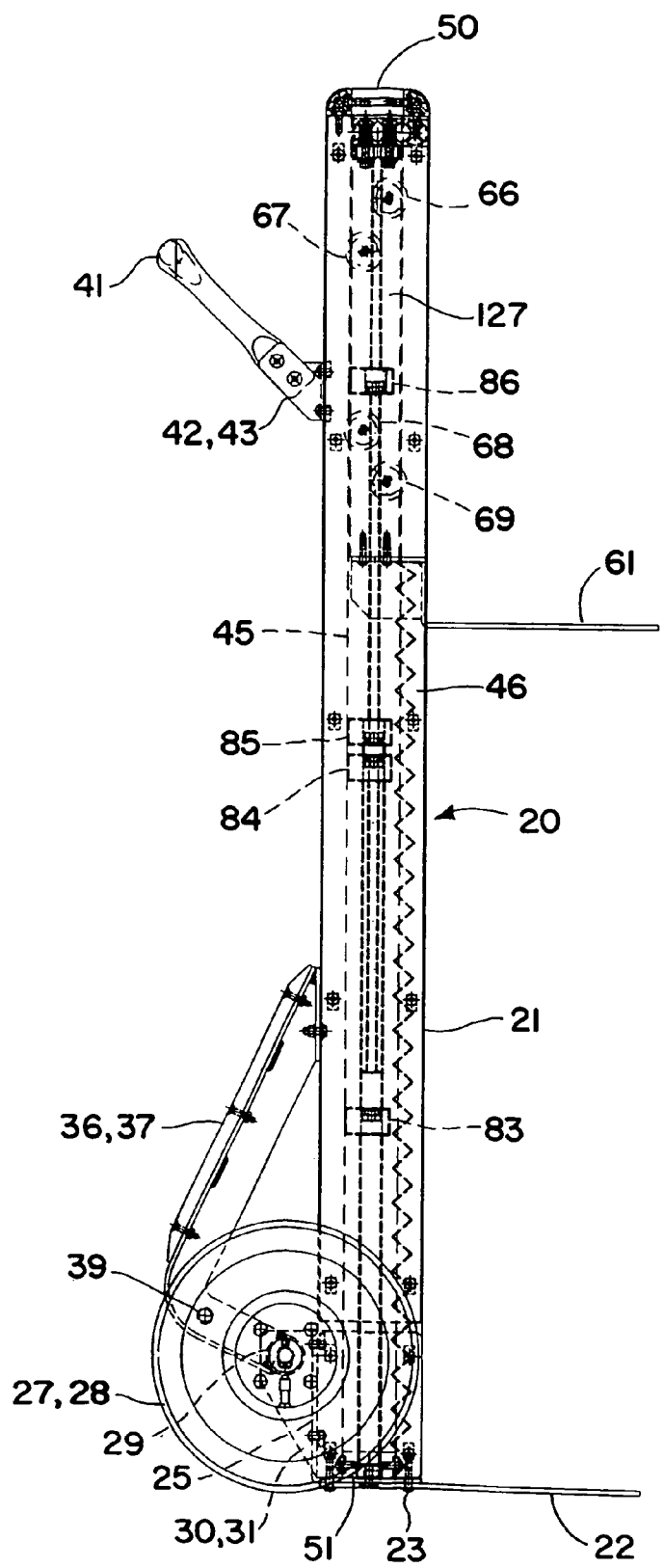
FIG. 2 is a side elevation of the cart as seen from the right hand side of FIG. 1.
Figure 3:
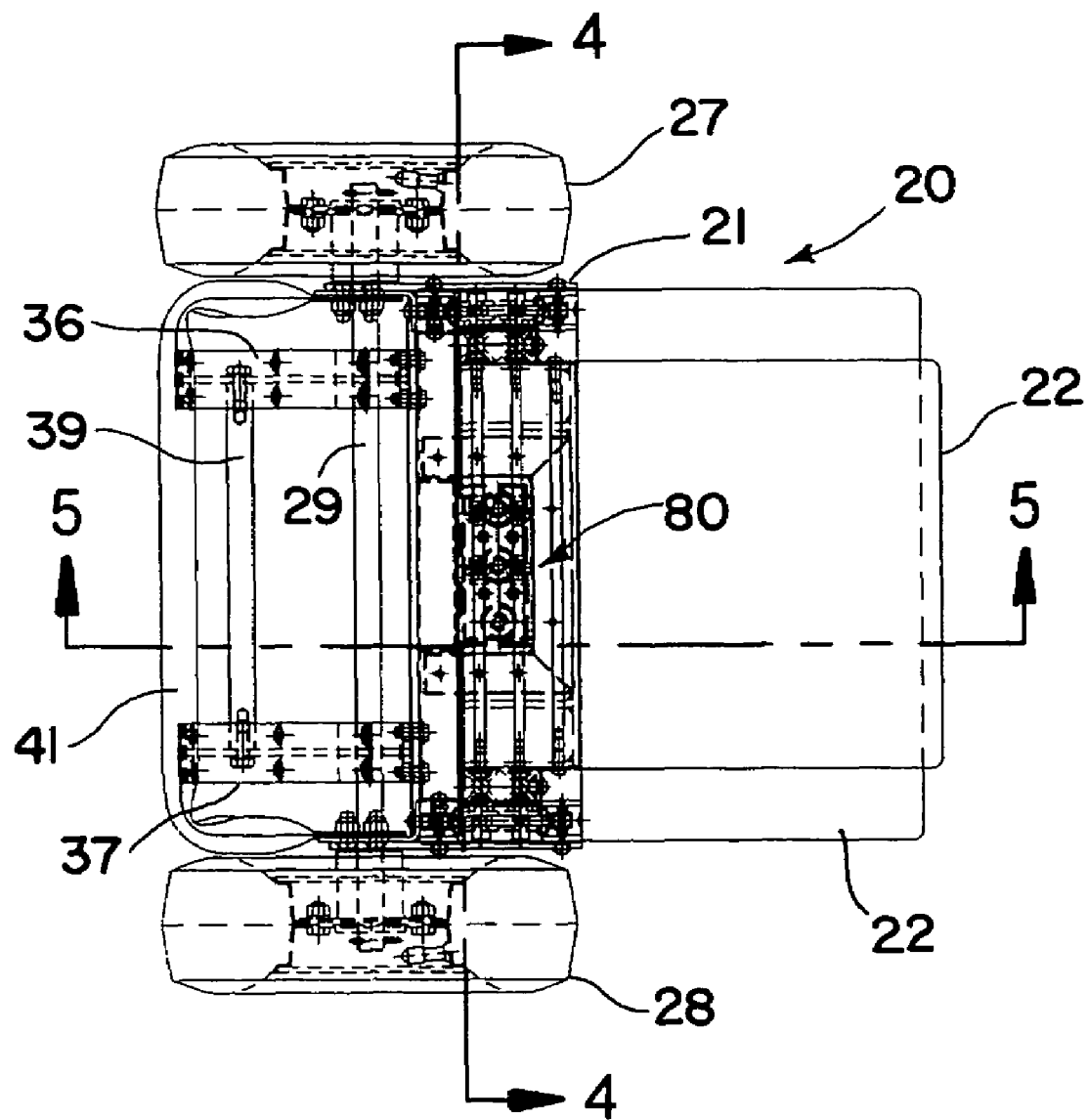
FIG. 3 is a top plan view of the cart.
Figure 5:
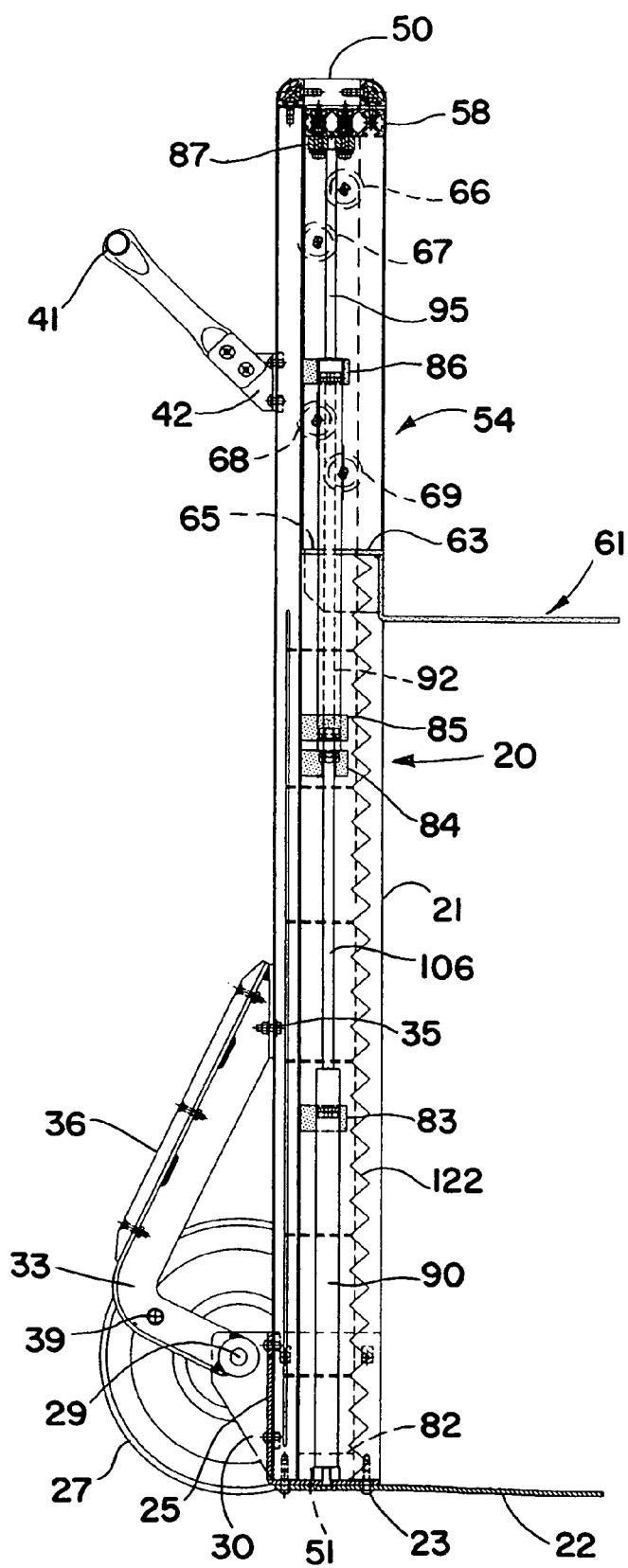
FIG. 5 is a section taken from the line 5-5 of FIG. 3.

A pair of pneumatic tire wheels seen at 27 and 28 are mounted on transverse axle 29 outboard of the main upright frame 21 as seen in FIG. 1. The axle 29 is supported by wheel brackets 30 and 31 secured to the back of the frame. Generally L-shaped skid braces 33 and 34 are mounted on the axle 29 at their lower end and fastened to the back of the upright frame at their upper ends as indicated at 35 more clearly in FIG. 5. Each of the skid braces is provided with a skid plate as seen at 36 and 37, respectively. The skid plates enable the cart to be pulled over a step or a curb, for example. It is also noted that the two skid braces are interconnected by a horizontal rod shown generally at 39 which serves as a foot brace. The operator may simply place a foot on the brace when tilting the cart backwardly or to the left as seen in FIGS. 2 and 5 for transportation of a stack formed thereon.

The top rear of the upright frame also includes a horizontally extending handle indicated at 41 which includes bent ends, in turn secured to handle brackets 42 and 43 secured to the upper end of the rear of the upright frame 21.

The sides of the upright frame 21 are formed by relatively closely spaced generally tubular frame members seen more clearly for example in FIGS. 2, 5, 7 and 8. These frame members are shown at 45 and 46 for one side and at 47 and 48 for the opposite side. Each of the parallel upright frame members on the respective sides of the frame is interconnected by a relatively short horizontal frame as seen at 50 and 51. Transversely, the parallel upright side frames are interconnected by the transverse frame 52 at the top and the plate 22 at the bottom.

Figure 10:
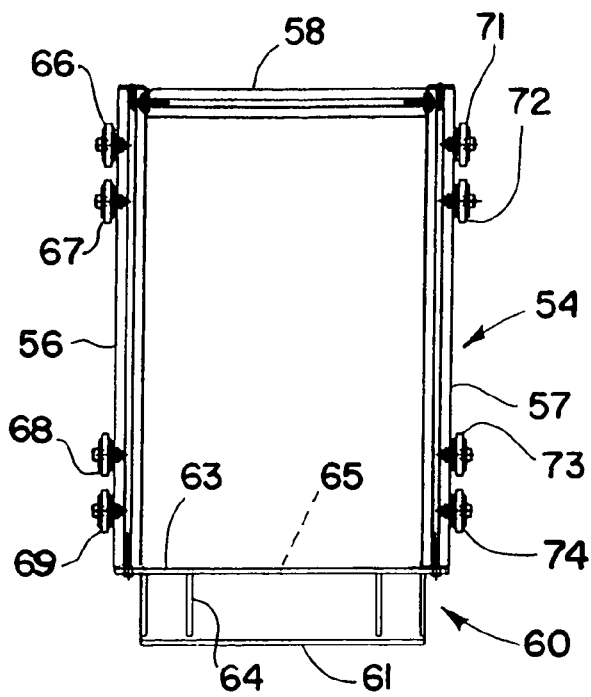
FIG. 10 is a front elevation of the slide frame which rides in the main frame.
Figure 11:
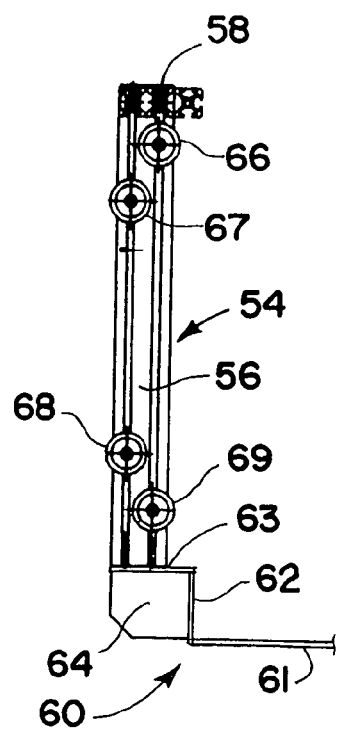
FIG. 11 is a side elevation of the slide frame.
Figure 12:
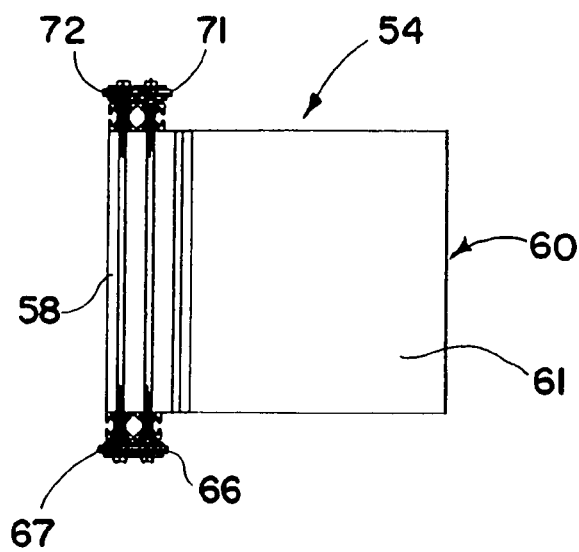
FIG. 12 is a plan view of the slide frame.
Figure 13:
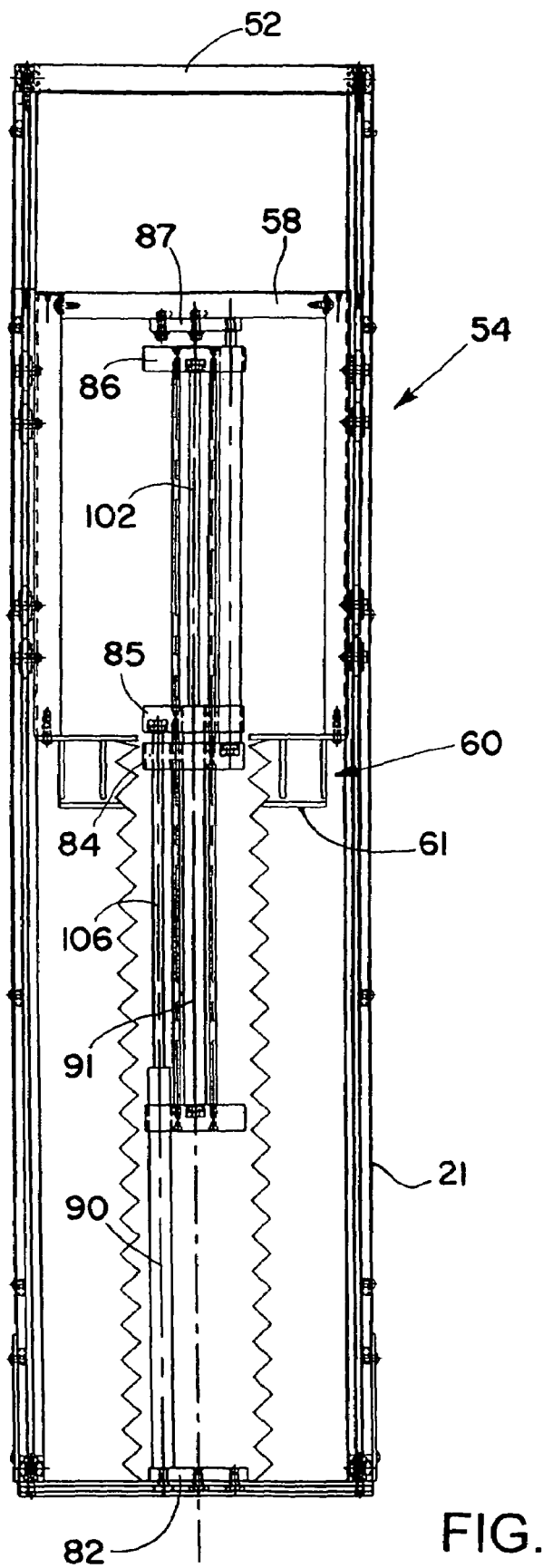
FIG. 13 is a view like FIG. 4, but showing the slide frame having descended one increment.

The parallel upright side frames form tracks which accommodate rollers mounted on the vertically movable slide frame shown generally at 54. The slide frame is shown in its uppermost position in FIGS. 1, 2, and 5 and is shown in detail in FIGS. 10 through 12. As can be seen more easily with reference to FIGS. 10-12, the slide frame includes vertically extending side frame members 56 and 57 interconnected at the top by a transverse frame member 58. The bottom of the side frame members are interconnected by a shelf or platform structure seen at 60. The shelf structure includes a horizontally projecting plate 61 extending forwardly from the lower end of a relatively short vertical plate 62 which is in turn connected to the forward edge of relatively short horizontal plate 63 in turn fastened to the vertical slide frame members 56 and 57. The vertical and horizontal plates 62 and 63 are braced by gussets 64 seen in FIGS. 10 and 11 as well as in other Figures. The plate 63 is provided with a rearwardly opening cutout or notch 65 to accommodate the spring biasing mechanism hereinafter described.

The slide frame side member 56 is provided with projecting rollers 66, 67, 68, and 69, while the opposite side frame 54 is provided with oppositely projecting rollers 71, 72, 73, and 74. The rollers 66 and 67 are both vertically and horizontally offset as are the rollers 68 and 69. The same is true for the rollers on the opposite side of the frame. The rollers may be mounted on bronze bushings or journals on stub shafts projecting from the side frame members of the slide frame.

The frame members for both the upright vertical frame and the slide frame may be extruded aluminum or other metal structures of essentially square or tubular configurations, and a standard form may include an x-shape core with a slot in each face. Such shapes may come in square, half-round, or quarter-round configurations and are ideal for fabricating the frames illustrated. The rollers illustrated may ride in the slots in the inside faces of the vertically extending slide frame members of the main upright frame. In this manner the slide frame member is confined for vertical movement in the tracks 45, 46, 47 and 48 provided by the upright main frame.

Referring now more particularly to FIGS. 1, 5, and 6, there is illustrated a gas spring biasing mechanism which urges the shelf or platform 61 to its uppermost position. This spring biasing mechanism is shown generally at 80. With reference to such figures it will be seen that the spring biasing mechanism comprises a bottom mounting plate 82, a lowermost slide block 83, an intermediate slide block 84, a further intermediate slide block 85, an uppermost slide block 86, and a top mounting plate 87. The slide blocks 83 and 86 may be identical, but the slide block 86 is inverted. Similarly, the slide blocks 84 and 85 may be identical but the slide block 85 is inverted. The bottom mounting plate 82 is secured by the fasteners illustrated in FIG. 1 to the bottom of the main upright frame. The top mounting plate 87 is secured to the underside of the lateral frame member 58 at the top of the slide frame 54.

In the spring biasing mechanism illustrated, three gas springs in the form of piston-cylinder assemblies are employed and they are illustrated at 90, 91 and 92. Preferably, the gas spring cylinders are each rated for a different load. For example, the uppermost gas spring 92 may be rated at 50 lbs. The intermediate gas spring 91 may be rated at 75 lbs., while the lowermost gas spring 90 is rated at 100 lbs. The loading of the gas springs may vary depending upon the uses to which the cart is placed, but normally the loading will increase in descending order.

The uppermost gas spring 92 has its blind end connected to the block 85 by knurled nut 94, while the rod 95 is connected at 96 to the top mounting plate 87.

The cylinder 92 telescopes through the hole 98 in block 86. Thus the gas spring 92 controls the spacing between the block 85 and the top mounting plate 87.

The gas spring 91 is mounted at its blind end in block 83 with knurled nut 100, the cylinder telescopes through hole 101 in block 84 and the rod 102 projects through hole 103 in block 85 and is secured with knurled nut 104 to the block 86. The gas spring 91 thus controls the spacing between the lowermost slide block 83 and the uppermost slide block 86.

The gas spring 90 has its cylinder mounted on the bottom mounting plate 82 and its rod 106 telescopes through the slide block 84 and is connected by knurled nut 107 to the slide block 85. The cylinder 90 of the lowermost gas spring telescopes through the slide block 83 at 108. The gas spring 90 thus controls the spacing between the bottom mounting plate 82 and the slide block 85.

The center section of the spring biasing mechanism formed by the slide blocks 83, 84, 85 and 86 is formed in two parts which are relatively moveable with respect to each other. The upper slide block 86 and the lower most intermediate slide block 84 are interconnected by tie-rods shown at 112 and 113. The tie-rods are connected by the fasteners shown at 114 to the slide blocks 86 and 84 and telescope through the slide block 85. This requires that the slide blocks 86 and 84 move in unison.

Similarly, the slide block 85 and the slide block 83 are interconnected by tie-rods 116 and 117 which are secured to the blocks by the fasteners seen at 118 requiring that the blocks 85 and 83 move in unison.

As seen when comparing FIGS. 1 and 5 with FIG. 6, when all of the gas springs are fully extended the slide block 84 is positioned closely below the slide block 85.

As seen more clearly in FIGS. 1 and 5, the gas spring biasing mechanism projects through the notch 65 in the top plate of the shelf or platform and that portion of the biasing mechanism below the notch is enclosed in a boot or bellows seen at 122. The top of the boot or bellows may be secured at the notch 65.

The upright frame is provided with a rear cover 124 as well as side covers 126 and 127. The front of the vertical frame from which the platform or shelf 61 projects is not provided with a cover.

Operation

Figure 4:
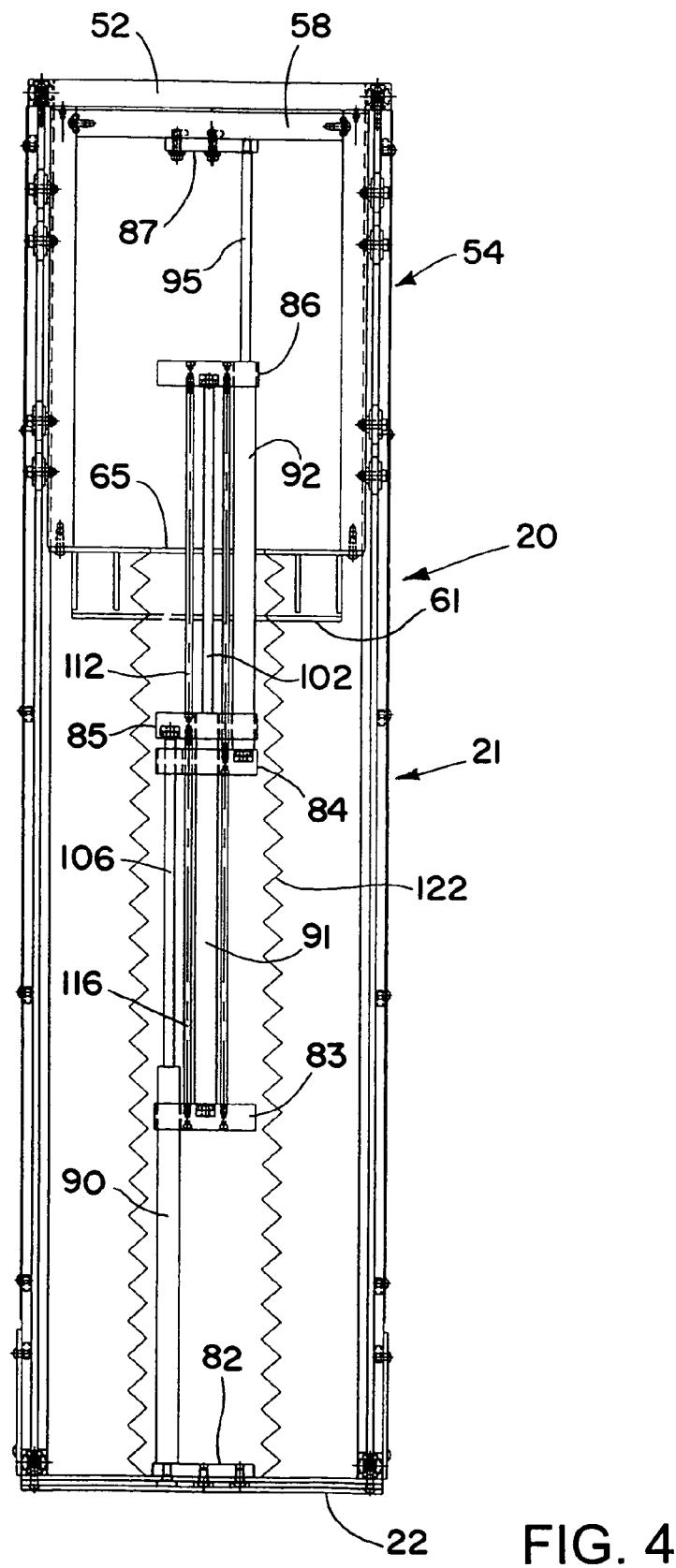
FIG. 4 is a section taken from the inside of the rear cover plate as seen from the line 4-4 of FIG. 3.

Referring now more particularly to FIGS. 4, 13, 14 and 15, the various vertical positions of the shelf or slide frame are illustrated. In FIG. 4 the slide frame is in its uppermost position and in such position the shelf or platform 61, in the illustrated embodiment, is approximately 34 inches above the floor which is a bit better than at desk or table height. It is also noted that the projecting platform 61 of the shelf is slightly more narrow but projects a bit further than the base plate 22. With the slide frame and platform in its elevated position the cart will stand vertically upright in a stable fashion, as seen for example in FIG. 2.

It will be appreciated that the cart of the present invention may be employed to stack and transport a wide variety of items which may have various weights. For example, the operator may place a first item on the projecting shelf or platform 61 and the spring biasing mechanism may not move. It depends on the weight of the item positioned on the platform. After the operator places the next or even a further item on the forming stack, when sufficient weight is on the platform the top gas spring will yield causing the slide frame to move to the position seen in FIG. 13. In this position only the top gas spring has responded to the load but the platform has nonetheless moved downwardly in response to the load. In the FIG. 13 position the rod 95 of the upper gas spring 92 has simply retracted. The intermediate frame has remained in position with the upper and lower parts fully separated.

Figure 14:
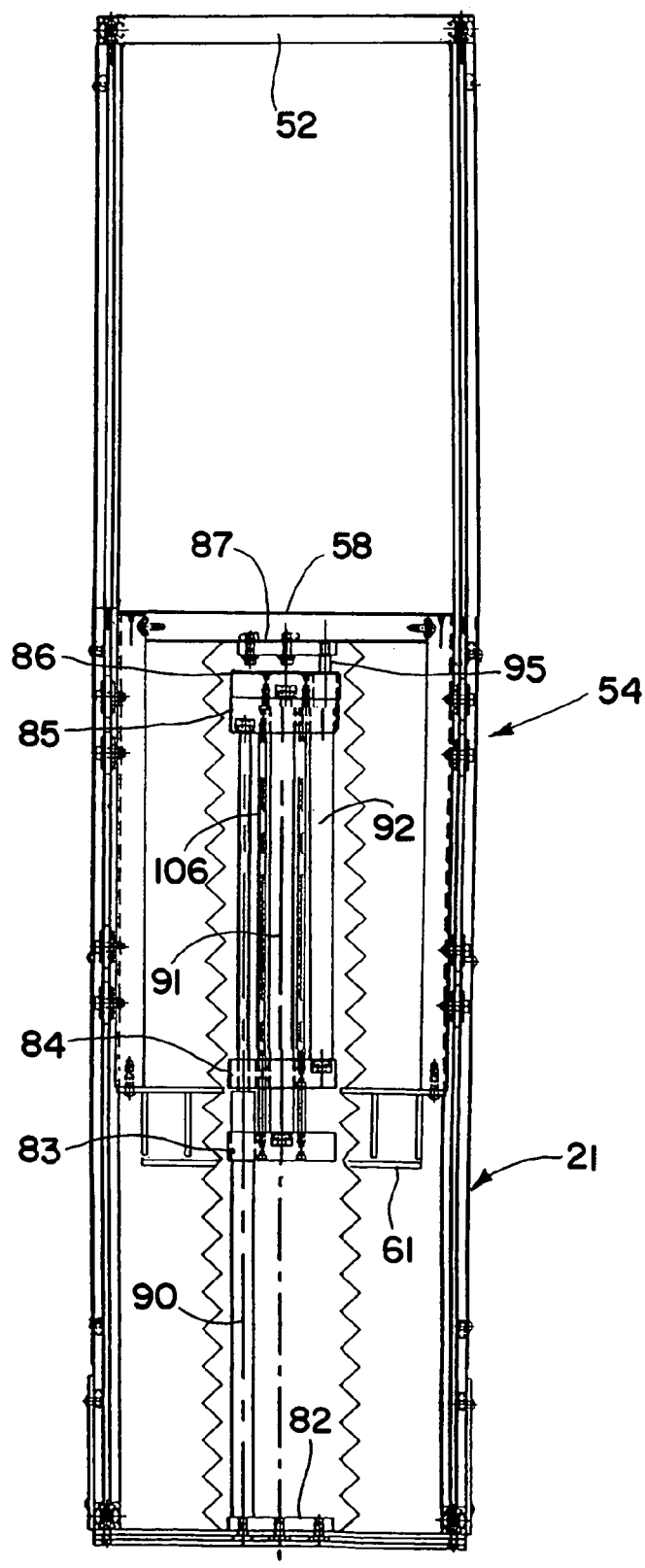
FIG. 14 is a similar view with the slide frame descended to the next increment.
Figure 15:
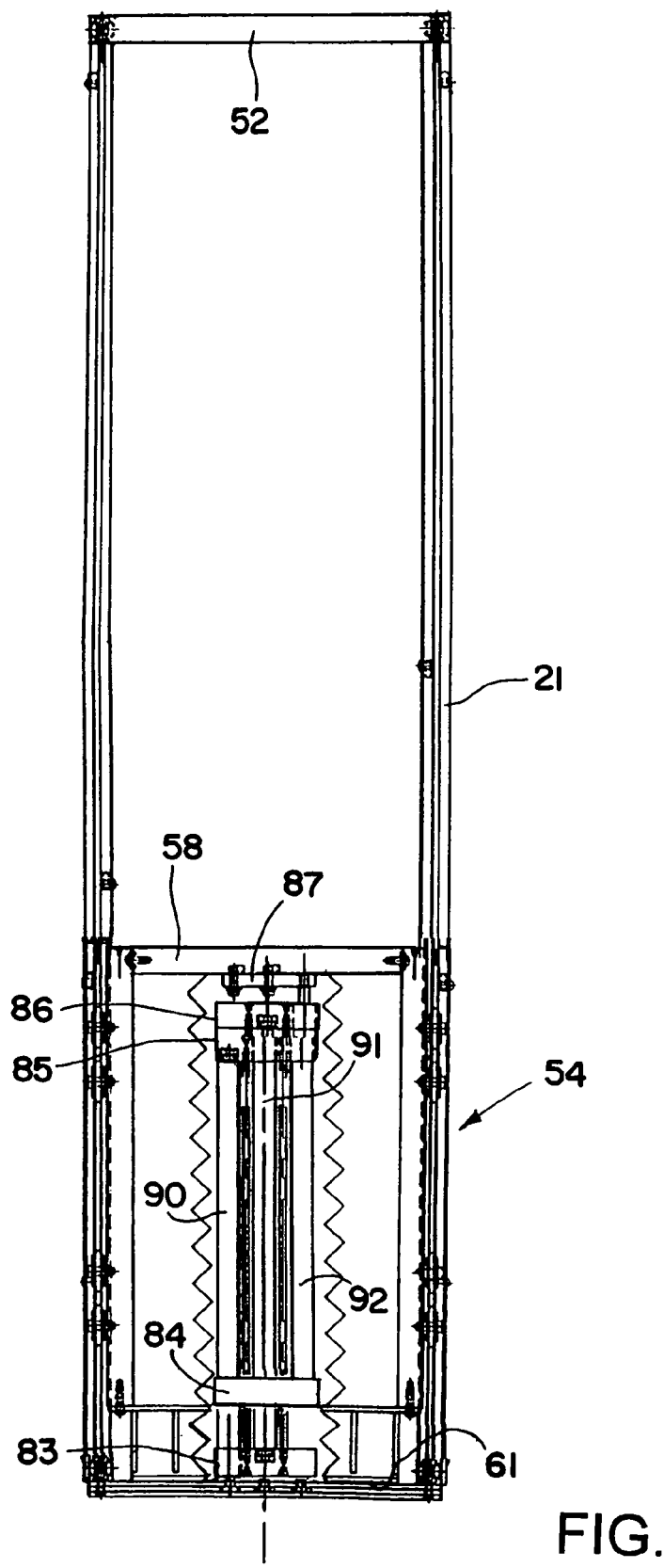
FIG. 15 is a similar view with the slide frame fully down.

As the operator continues to build the stack or load on the platform, the next gas spring 91 will yield moving the slide frame to the second intermediate position seen in FIG. 14. The upper part of the intermediate slide block assembly has moved downwardly as the rod 102 retracts into the intermediate cylinder 91. Continued building of the stack then causes the slide frame to move to the lowermost position seen in FIG. 15 when the rod 106 of the gas spring 90 retracts moving the shelf or platform to its lowermost position. In FIG. 15 all three gas cylinders are retracted.

When the platform is in its lowermost position and the cart has received the stack built from the top, the operator simply tilts the cart backwardly or to the left as seen in FIG. 2 and transports the stack to another location. At such other location the stack is unloaded from the top. As the weight of the stack decreases as the operator removes each item from the top of the stack, the gas springs will again extend but in reverse order of their retraction. Initially the bottom spring extends to move the platform up to the first position seen in FIG. 14. Continued removal of items from the top of the stack moves the stack to the intermediate position seen in FIG. 13 and the complete removal of the bottom items in the stack moves the platform to its fully elevated position seen in FIG. 4. The gas springs thus act in cascading fashion to move the forming or disappearing stack through the increments shown.

In some situations it is desirable that the platform 61 remain down even though all or part of the stack load is removed. Referring now to the embodiment shown in FIGS. 16, 17 and 18, the cart includes a latch shown generally at 132 which automatically locks the platform down when it bottoms out so that the operator may then unload the cart while the platform remains in place. With a readily accessible kick plate shown at 133, the latch is released and the unlocked platform is elevated by the gas spring assembly.

Figure 18:
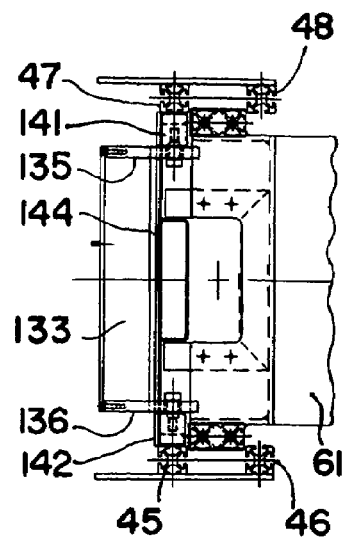
FIG. 18 is a fragmentary view looking down on the latch and also showing the kick release plate.
Figure 17:
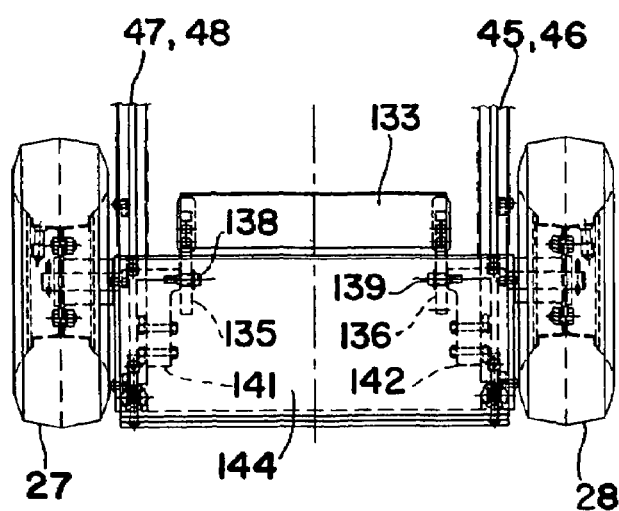
FIG. 17 is a fragmentary rear elevation showing the transverse kick release for operating the latch.

As seen more clearly in FIGS. 17 and 18, the latch assembly comprises two levers 135 and 136 with the kick plate 133 spanning between the tops of the levers. The levers are pivoted at 138 and 139 to brackets 141 and 142 respectively secured to the interior of frame members 45 and 47.

The brackets extend vertically in a space between the platform reinforcing structure such as plates 62 and 63 with the reinforcing gussets and vertical plate 144.

Figure 16:
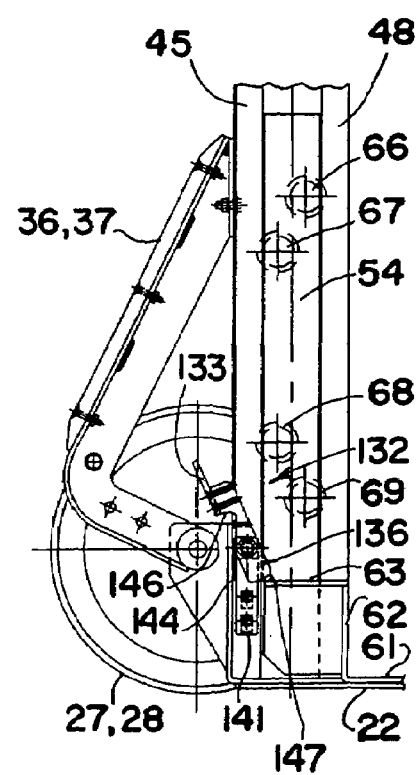
FIG. 16 is a fragmentary side elevation of another embodiment showing a platform latch when in the lowermost position.

The assembly of the two levers 135 and 136 together with the foot operated kick plate 133 is such that it will fall back against the top edge of plate 144 in its at rest condition. As seen in FIG. 16 the levers are provided with triangular notches 146 in which the upper edge of the plate seats. This holds the latch in the position shown in FIG. 16.

As the platform descends, the framework of the platform will engage the angled front or left side of the levers seen in FIG. 16, pivoting them and the kick plate to an upright position.

As the platform continues down, the top plate 63 will clear the lower ends of the levers, and the assembly then falls back to the position shown with the lower ends 147 of the levers projecting over the top of the back edge of plate 63. In this position the platform is latched down against the force of the gas springs. If desired all or part of the stack may be unloaded.

In order to release the latch the operator kicks the plate 133 forward to pivot the assembly to a vertical or upright position clearing the platform for vertical elevation.

The cart of the present invention may be used for stacking and transporting a wide variety of items such as cases, beverage containers, kegs, bottles, file cases, or even luggage for that matter. The projecting shelf may be tailor made to inter-fit and support cylindrical objects such as water bottles or kegs, for example.

It can now be seen that there is provided a transfer cart having a platform on which a stack of items may be built. As the weight of the stack increases the platform incrementally descends. In this manner the stack may be built by placing each item in an elevated position. The stack thus drops from under the user as the stack is built. Conversely, as an item is lifted from a stack the platform elevates avoiding the necessity to pick or place any item with respect to the floor.

The cart includes a cascading gas spring mechanism achieving four incremental positions of the platform with three springs and an interconnecting slide block mechanisms. The gas springs may be rated differently increasing in load rating top to bottom. The cart is particularly useful for transporting many stackable items.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

The invention claimed is:

1. A transfer cart comprising a platform movable to varying incremental positions, adapted to support a stack of objects, and means responsive both to weight being placed on said platform when at an elevated position to move the platform incrementally downwardly, and to weight being removed from the platform when at a lower position to move the platform incrementally upwardly, said means responsive comprising a plurality of sequentially operable gas springs one for each incremental position.

2. A cart as set forth in claim 1 wherein each gas spring has a different load.

3. A cart as set forth in claim 2 wherein the gas spring controlling the initial increment downwardly has a lower load rating than the gas spring controlling the initial increment upwardly.

4. A cart as set forth in claim 3 including at least three gas springs providing at least two intermediate positions for said platform.

5. A cart as set forth in claim 4 including an intermediate gas spring, and a two part slide block assembly interconnected by said intermediate gas spring.

6. A cart as set forth in claim 5 including a bottom gas spring connected to said two part slide block assembly.

7. A cart as set forth in claim 6 including a top gas spring connected to said two part slide block assembly and said platform.

8. A cart as set forth in claim 1 including a latch operative to hold said platform in its lowermost position.

9. A transfer cart comprising a platform adapted to support a stack of objects, said platform when loaded being in a lower position, and means responsive to objects being removed from the stack to move the platform upwardly incrementally, said means comprising a cascading gas spring assembly with respective gas springs for each increment of movement for moving the stack upwardly incrementally as objects are removed from the stack.

10. A cart as set forth in claim 9 wherein said cart includes a main frame, wheels and a stabilizing plate on the lower end of said main frame, and a slide frame supporting said platform for vertical movement on said main frame.

11. A cart as set forth in claim 9 including a latch optionally to hold said platform in said lower position.

12. A transfer cart comprising a platform adapted to support a stack of objects, said platform when unloaded being in an upper position, and means responsive to objects being placed upon the stack to move the platform downwardly incrementally, said means comprising a cascading gas spring assembly with respective gas springs for each increment of movement for moving the stack downwardly incrementally as objects are placed upon the stack.

13. A cart as set forth in claim 12 including a latch to automatically engage and lock said platform in its lowermost position.

14. A cart as set forth in claim 13 wherein said latch is pivoted and weight operated to engage the platform.

* * * * *